United States Patent [19]

Corsentino

[11] 4,209,068
[45] Jun. 24, 1980

[54] TRACK CLOSING ATTACHMENT FOR A MOBILE GROUND IRRIGATION TOWER

[76] Inventor: Joseph L. Corsentino, Rte. 1, 5487 Road T, Wiggins, Colo. 80650

[21] Appl. No.: 894,021

[22] Filed: Apr. 6, 1978

[51] Int. Cl.² .............................................. A01B 37/00
[52] U.S. Cl. ................................... 172/572; 172/676; 239/177
[58] Field of Search ............... 172/676, 572, 578, 582, 172/603, 134, 300, 301, 302, 574, 500, 494, 502; 239/212, 177

[56] References Cited
U.S. PATENT DOCUMENTS

| | | | |
|---|---|---|---|
| 1,062,329 | 5/1913 | Gorham | 172/500 |
| 1,252,658 | 1/1918 | Butler | 172/603 X |
| 1,821,048 | 9/1931 | Wright | 172/574 X |
| 1,887,348 | 11/1932 | Freeman | 172/134 |
| 2,319,899 | 5/1943 | Silver | 172/676 |
| 4,059,911 | 11/1977 | Bean | 239/177 |

Primary Examiner—Richard J. Johnson
Attorney, Agent, or Firm—Schwartz, Jeffery, Schwaab, Mack, Blumenthal & Koch

[57] ABSTRACT

An attachment for a mobile ground irrigation tower including a pivotal arm which supports a pair of spaced downwardly biased disks that serve to close the track formed by the tower wheel in the ground. The horizontal spacing of the disks may be varied to accommodate tracks of different widths.

12 Claims, 7 Drawing Figures

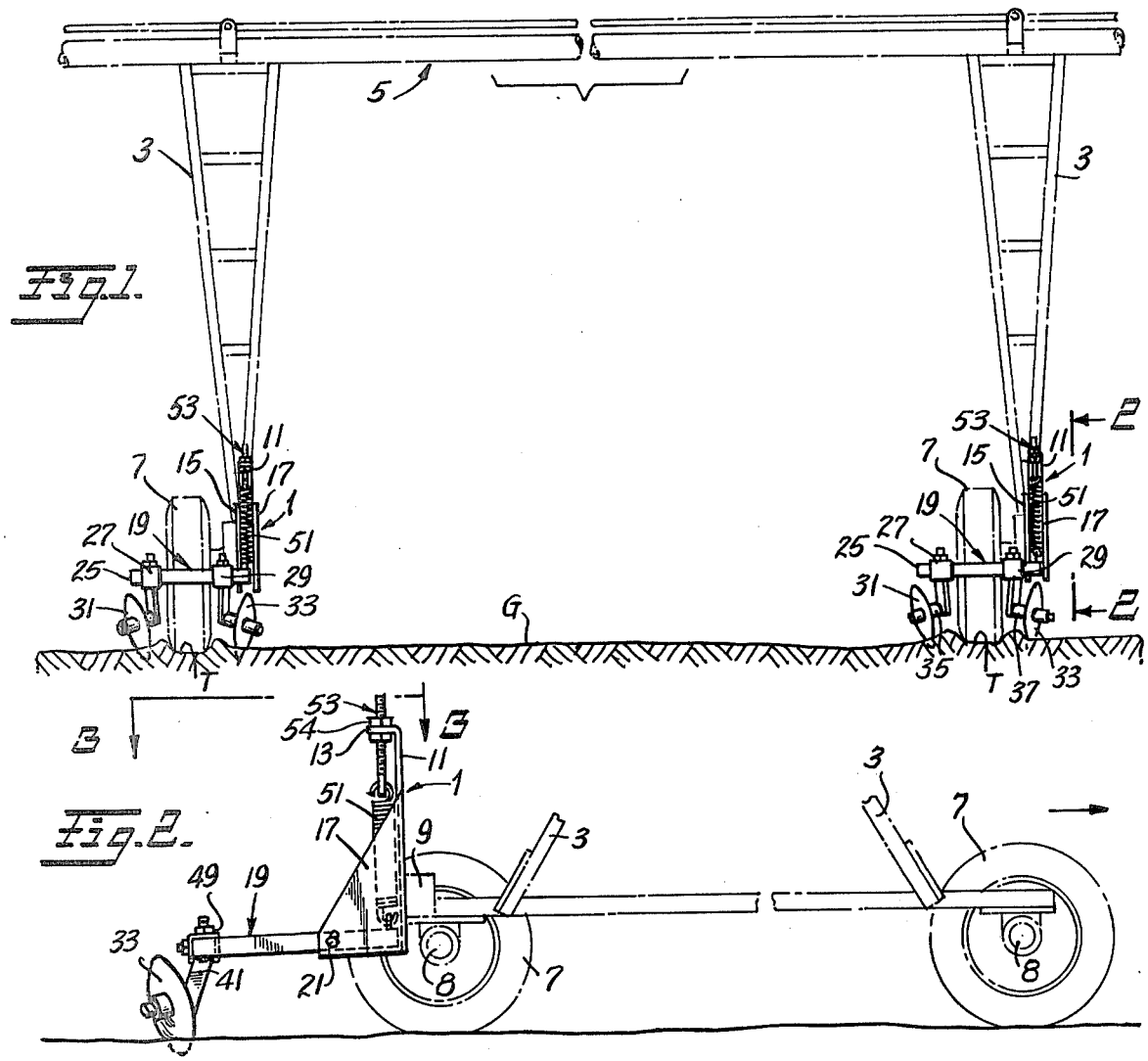

TRACK CLOSING ATTACHMENT FOR A MOBILE GROUND IRRIGATION TOWER

BACKGROUND OF THE INVENTION

1. Field of the Invention

The present invention relates generally to large mobile field irrigation apparatus. More particularly, the invention involves an attachment for closing tracks formed in the ground by the wheels of irrigation towers during the irrigating operation.

2. Description of the Prior Art

The irrigation of agricultural fields may be advantageously achieved by means of sprinkler pipes which are supported at spaced intervals by means of a plurality of vertical support frameworks or towers. Each individual tower is in turn supported for movement on the ground surface by means of at least one wheel and axle assembly. This arrangement thereby permits a long irrigation pipe to be supported across a large number of crop rows and efficiently irrigate a large swath of field by advancing the mobile towers through the open paths between crop rows.

The ground surface of a typical crop field is characteristically soft in nature. The large weight supported by the individual wheels of the irrigation towers causes each wheel to dig into the soft ground and form undesirable continuous deep tracks as the entire assembly progresses along the field during its irrigating function. The presence of irrigation water serves to increase this problem by further softening the earth. It is therefore apparent that the cumulative damage done to the ground surface by several consecutive irrigations with this type of apparatus is extremely undesirable for both crop welfare and facilitating the maintenance and harvesting of crops by other agricultural equipment.

SUMMARY OF THE INVENTION

It is therefore an object of the invention to provide means for effectively closing the tracks formed by the wheels of mobile irrigation towers.

It is another object of the invention to provide a means for closing the tracks formed by mobile irrigation towers which is simple in construction and economical to manufacture.

It is yet another object of the invention to provide a means for closing the track formed by the wheel of a mobile irrigation tower wherein the means is adjustable to accommodate tracks having widths of different sizes.

It is still a further object of the invention to provide an attachment for closing the track formed by a mobile irrigation tower which is reliable in action and can be utilized with varying ground surface conditions.

These and other objects of the invention are achieved by providing an attachment that is easily secured to the framework structure of existing irrigation towers and includes a bracket carrying a pivotal arm thereon. The pivotal arm supports a pair of outwardly angled closing disks which are disposed directly behind the wheel and over the track formed thereby. Means are provided for biasing the pivotal arm in a downward direction to thereby impart positive engagement between the disks and the ground surface. The disks are adjustably supported on the pivotal arm so that their spacing can be varied to accommodate different size track widths.

BRIEF DESCRIPTION OF THE DRAWINGS

FIG. 1 is a fragmentary rear elevational view depicting in phantom lines a mobile irrigation apparatus with the invention in operative association with the ground engaging wheels of the irrigation towers;

FIG. 2 is an enlarged fragmentary side elevational view of the invention as viewed along the line 2—2 of FIG. 1;

FIG. 3 is an enlarged plan view of the invention, taken on the line 3—3 of FIG. 1;

DETAILED DESCRIPTION OF THE PREFERRED EMBODIMENTS

Figure 5:
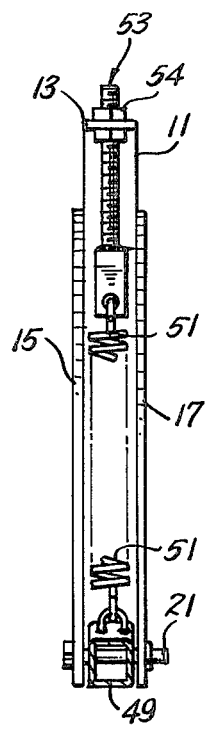
FIG. 5 is a vertical sectional view taken on the line 5—5 of FIG. 4.

An attachment 1 according to the invention is shown in FIG. 1 in its intended environment of use with an irrigation tower 3 of an irrigation apparatus, generally indicated at 5. Though only two towers 3 are shown, it is understood that apparatus 5 may include more than two towers 3 spaced at intervals along its length.

Each tower 3 includes a pair of wheels 7 which are spaced apart along the path of travel on ground G and supported on axles 8. This is more clearly shown in FIG. 2. As also indicated, the weight of apparatus 5 causes wheels 7 to form tracks T in the surface of ground G by pushing earth to either side of each wheel 7 and also pressing earth downwardly to form a depression that extends below the surface of ground G. Attachment 1 may be secured to tower 3 by bolting or welding attachment 1 to a frame section 9 of tower 3. It is understood that any convenient suitable means well known in the art for securing attachment 1 to tower 3 may be utilized so long as the basic earth closing function of attachment 1 is neither hindered nor impaired.

Attachment 1 includes a bracket 11 which is secured to framework 9 and includes a flange 13 at one end thereof. Bracket 11 also includes a pair of substantially triangular-shaped plates 15 and 17 which have one pair of corresponding adjacent edges secured, such as by welding, in a spaced disposition to opposite edges of bracket 11. This arrangement is more clearly shown in FIGS. 3-5.

Figure 6:
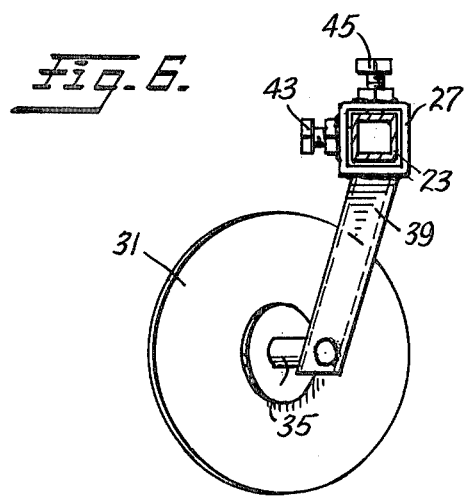
FIG. 6 is a vertical sectional view taken on the line 6—6 of FIG. 3.

An arm 19 has one end partially disposed in the space defined by plates 15 and 17 and is secured therein by a nut and bolt assembly 21 journaled through plates 15 and 17. This permits arm 19 to pivot with respect to bracket 11. As shown in FIG. 3, arm 19 is generally of an L-shaped configuration having a transverse leg 23 which is substantially parallel to the axes of rotation of wheels 7 when attachment 1 is in its operative association with tower 3. Leg 23 includes a free end 25 which permits a pair of sleeves 27 and 29 to be detachably received and secured thereon for supporting a pair of earth closing disks 31 and 33. Referring to FIGS. 3 and 6, disks 31 and 33 are supported, preferably for rotation, on a respective pair of outwardly angled shanks 35 and 37. Sleeve 27 includes a projection 39 to which shank 35 is rigidly attached. Similarly, sleeve 29 includes a projection 41 to which shank 37 is rigidly attached.

The cross-sectional configuration of sleeves 27 and 29 correspond to the cross-sectional configuration of leg 23, which configuration is preferably square in order to prevent rotation of sleeves 27 and 29 about leg 23 due to the rotational torque forces imparted by projections 39 and 41 during the earth closing operation. Sleeve 27 is rigidly secured in position on leg 23 by means of a pair of lock bolts 43 and 45. Similarly, sleeve 29 may be secured to leg 23 by a pair of lock bolts 47 and 48. Tightening of bolts 43, 45, 47 and 48 causes their respective ends to bear against leg 23 and thereby prevent sliding movement of sleeves 27 and 29 thereon. In this manner, sleeve 27 and 29 may be initially adjusted to set the spacing between disks 31 and 33 in accordance with the width of the track desired to be closed and bolts 43, 45, 47 and 48 may thereafter be tightened to maintain this spacing.

Figure 4:
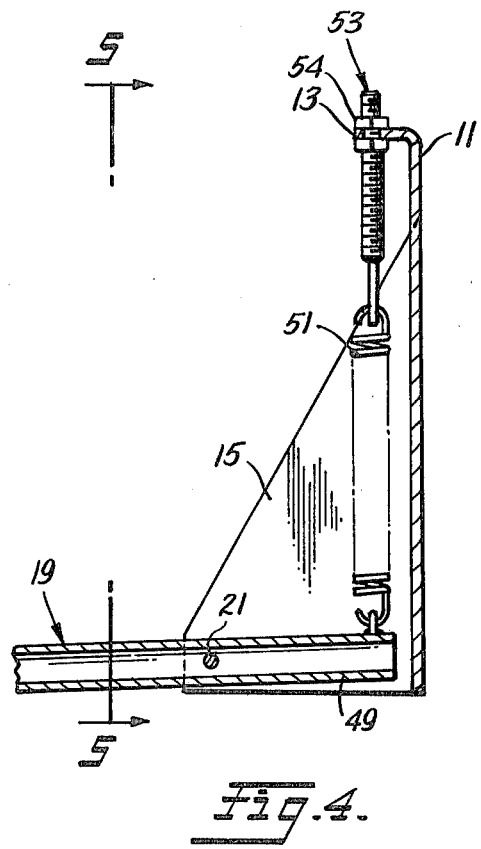
FIG. 4 is a fragmentary vertical sectional view taken on the line 4—4 of FIG. 3.

As seen in FIGS. 4 and 5, the other end of pivotal arm 19, as indicated at 49, is connected to a biasing means 51, depicting as a coil spring or the like. Spring 51 is also secured to flange 13 of bracket 11 through an adjustment toggle bolt assembly 53 which is journaled through flange 13 and permits the varying of tension or bias imparted to arm 19 by spring 51. In the configuration depicted in FIG. 4, tightening of assembly 53 by turning an adjustment nut 54 in the clockwise direction elongates spring 51 and pulls end 49 towards assembly 54. This in turn causes arm 19 to pivot about bolt 21 so that leg 23 is caused to pivot in a direction opposite to the movement of end 49. Therefore, disks 31 and 33 are caused to make positive engagement with ground G on track T formed by wheel 7. If disks 31 and 33 should encounter raised surface portions on ground G, this causes arm 19 to pivot upwardly against the force of spring 51. This arrangement therefore accords a controllable degree of bias which permits attachment 1 to traverse uneven ground conditions.

As is apparent, tracks T continuously formed by wheels 7 in ground G are in turn continuously closed by the operation of attachment 1 as apparatus 5 conducts its irrigation function across a crop field.

Figure 7:
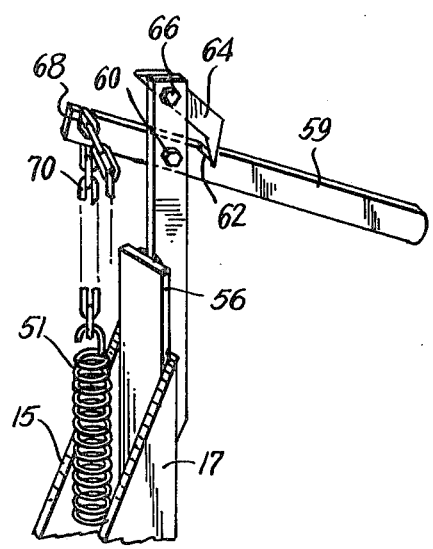
FIG. 7 is a fragmentary perspective view depicting an alternative embodiment of the means for varying the degree of downward bias imparted to the disks.

An alternative mechanism for varying the degree of bias imparted to disks 31 and 33 is shown in FIG. 7. In this embodiment, plates 15 and 17 are welded along one pair of corresponding adjacent edges to the longitudinal edges of a shortened bracket 56. A support bar 58 is attached to and extends beyond the free end of bracket 56. A lock handle 59 is carried by bar 58 and attached thereto by a first bolt assembly 60 or similar fastening means permitting pivotal movement of handle 59 with respect to bar 58. Handle 59 includes a first notch 62 for engagement by a pawl 64 that is also pivotally attached to bar 58 by a second bolt assembly 66 or similar fastening means.

Handle 59 includes a second notch 68 within which an individual link of a chain 70 may be disposed and maintained against slippage by virtue of the ninety degree offset of adjacent links. One end of chain 70 is attached to spring 51 while the other end of chain 70 is permitted to remain free and connected to a sufficient length of chain 70 to provide the necessary variations in the tensioning of spring 51.

Spring 51 is tensioned by removing pawl 64 from notch 62 and pivoting handle 59 so that notch 68 moves toward spring 51. Chain 70 is then stretched so that the desired link can be disposed in notch 68. When this is accomplished, handle 59 is pivoted in the opposite direction against the tension of spring 51, as imparted through chain 70, and locked into position by disposing pawl 64 in notch 62. Increasing or decreasing tension in spring 51 is effected by decreasing or increasing, respectively, the length of chain between spring 51 and notch 68. In this manner, the degree of downward bias imparted to disks 31 and 33 can be controlled by varying the tension of spring 51 as applied to the end 49 of arm 19.

It is to be understood that the forms of the invention herein shown and described are to be taken as preferred embodiments of the same, and that various changes in shape, size and arrangement of parts may be resorted to, without departing from the spirit of the invention or scope of the subjoined claims.

I claim:

1. A track closing attachment mounted on mobile wheel-supported ground irrigation towers comprising:
   (a) a pair of wheels, a front wheel mounted on the forward position of the tower and a rear wheel mounted on the rearward portion of the tower and wherein the tower moves in the direction of the forward wheel,
   (b) a bracket for securing the attachment to the tower adjacent to the rearward wheel, and extending rearwardly thereof,
   (c) a pair of disks for engaging the ground and closing the track formed by the wheels,
   (d) a pivotal arm carried by the bracket for supporting the disks in a spaced disposition behind the rear wheel, and
   (e) means for biasing the pivotal arm downwardly to maintain the disks in engagement with the ground.

2. The attachment of claim 1 wherein the pivotal arm is of a substantially L-shaped configuration.

3. The attachment of claim 1 further including means carried by the pivotal arm for supporting the disks on the pivotal arm and varying the spacing between the disks.

4. The attachment of claim 3 wherein the means carried by the pivotal arm include a pair of detachable sleeves, with each sleeve including at least one locking bolt for rigidly securing the sleeve in a stationary position with respect to the pivotal arm.

5. The attachment of claim 1 wherein the biasing means includes a coil spring having one end secured to the bracket and the other end secured to the pivotal arm.

6. The attachment of claim 1 further including means for varying the degree of bias imparted to the pivotal arm by the biasing means.

7. The attachment of claim 6 wherein the means for varying the degree of bias includes a toggle bolt assembly.

8. The attachment of claim 6 wherein the means for varying the degree of bias includes:
   (a) a flexible elongated member having one end connected to the biasing means, and
   (b) means for securing the elongated member at selective points along the length thereof and tensioning same.

9. The attachment of claim 8 wherein
   (a) the elongated member is a chain, and
   (b) the securing and tensioning means includes a pivotal handle having a first notch for engagement by a pawl and a second notch for engagement by a selected link of chain.

10. The attachment of claim 1 wherein each disk is supported on the pivotal arm by an outwardly projecting shank.

11. The attachment of claim 1 wherein the bracket includes a pair of spaced substantially triangular-shaped plates.

12. The attachment of claim 1 wherein the pivotal arm is connected to at least one of the triangular-shaped members for pivotal movement with respect thereto.

* * * * *